(12) United States Patent
Wu et al.

(10) Patent No.: US 8,101,703 B2
(45) Date of Patent: Jan. 24, 2012

(54) PRECURSOR SOLUTION FOR POLYIMIDE/SILICA COMPOSITE MATERIAL, ITS MANUFACTURE METHOD, AND POLYIMIDE/SILICA COMPOSITE MATERIAL HAVING LOW VOLUME SHRINKAGE

(75) Inventors: Chung-Jen Wu, Kaohsiung (TW);
Min-Chi Wang, Kaohsiung (TW);
Chung-Hung Chang, Kaohsiung (TW);
Meng-Yen Chou, Kaohsiung (TW);
Chin-Chang Chuang, Kaohsiung (TW);
Hsin-Wei Huang, Kaohsiung (TW);
Shu-Wan Lu, Kaohsiung (TW);
Chin-Min An, Kaohsiung (TW);
Chung-Hao Wu, Kaohsiung (TW);
Wen-Chang Chen, Kaohsiung (TW);
Cheng-Tyng Yen, Kaohsiung (TW);
Yu-Wen Wang, Kaohsiung (TW);
Kuo-Huang Hsieh, Kaohsiung (TW)

(73) Assignee: Eternal Chemical Co., Ltd, Kaohsiung (TW)

( * ) Notice: Subject to any disclaimer, the term of this patent is extended or adjusted under 35 U.S.C. 154(b) by 0 days.

(21) Appl. No.: 12/846,871

(22) Filed: Jul. 30, 2010

(65) Prior Publication Data

US 2010/0297455 A1   Nov. 25, 2010

Related U.S. Application Data

(62) Division of application No. 11/119,555, filed on May 2, 2005, now Pat. No. 7,790,828.

(30) Foreign Application Priority Data

Apr. 30, 2004   (TW) .................................. 93112308 A

(51) Int. Cl.
C08G 77/04   (2006.01)
(52) U.S. Cl. ............................................. 528/26; 528/32
(58) Field of Classification Search .................... 528/26, 528/32

See application file for complete search history.

(56) References Cited

U.S. PATENT DOCUMENTS

| | | | |
|---|---|---|---|
| 4,829,131 A | 5/1989 | Lee | |
| 4,957,993 A | 9/1990 | Lee | |
| 4,996,278 A | 2/1991 | Lee | |
| 6,010,825 A | 1/2000 | Hagen et al. | |
| 6,011,123 A | 1/2000 | Kurosawa et al. | |
| 2005/0048297 A1* | 3/2005 | Fukuda et al. | ................ 428/458 |

FOREIGN PATENT DOCUMENTS

| | | |
|---|---|---|
| TW | 168705 | 9/1991 |
| TW | 173314 | 11/1991 |
| TW | 182622 | 4/1992 |
| TW | 536664 | 6/2003 |

* cited by examiner

Primary Examiner — Kuo-Liang Peng
(74) Attorney, Agent, or Firm — Ladas & Parry LLP

(57) ABSTRACT

A process for preparing a precursor solution for polyimide/silica composite material and a process for forming a polyimide/silica composite material film on a substrate, including adding a monomer of a silane compound to allow a poly(amic acid) to carry a silica moiety; adding a monomer of formula $(R^6)_x Si(R^7)_{4-x}$ to allow the silica moiety to carry a photopolymerizable unsaturated group; adding a monomer of formula $R^8 N(R^9)_2$ to allow the poly(amic acid) to carry a photopolymerizable unsaturated group, where $R^6$, $R^7$, $R^8$, $R^9$ and x are as defined in the specification. Also, a precursor solution for polyimide/silica composite material and a polyimide/silica composite material. The composite material is useful in microelectronic devices, semiconductor elements, and photoelectric elements.

11 Claims, 8 Drawing Sheets

PRECURSOR SOLUTION FOR POLYIMIDE/SILICA COMPOSITE MATERIAL, ITS MANUFACTURE METHOD, AND POLYIMIDE/SILICA COMPOSITE MATERIAL HAVING LOW VOLUME SHRINKAGE

CROSS-REFERENCE TO RELATED APPLICATIONS

This application is a divisional application of U.S. Ser. No. 11/119,555 filed on May 2, 2005 now U.S. Pat. No. 7,790,828, which claims priority to Taiwanese Patent Application No. 093112308 filed on Apr. 30, 2004; the contents of which are hereby incorporated by reference into the present application.

BACKGROUND OF THE INVENTION

1. Technical Field of the Invention

The invention relates to a process for preparing a precursor solution for polyimide/silica composite material, a process for forming a polyimide/silica composite material film on a substrate, the resulting precursor solution and composite material, and the use thereof.

2. Prior Art

Metallic, ceramic, polymeric and electronic materials are currently four primary areas of materials science. Each type of the materials has its special properties, merits and faults. For example, polymeric materials are processable, flexible, elastic, corrosion resistant, insulating and cheap, but they have relatively poor heat resistance and mechanical strength. Ceramic materials are rigid and less active with excellent heat resistance and mechanical strength, but they are heavier and friable. Brand new materials with excellent properties may be made through combining the advantages of various materials while remedying their shortcomings. Under this notion, widespread researches have been carried out on organic-inorganic hybrid materials, i.e. composite materials.

The domain of conventional composite materials usually ranges from hundreds of microns to centimeter grade. Organic or inorganic components of such materials mainly play a role of the changing the structures or functions of the materials, and the materials are normally prepared by physically blending these components. Hybrid materials, however, are normally prepared through chemical methods, such as sol-gel or self-assembly methods, which remedy the shortcomings of the composite materials by the microscopic mixing of the organic and inorganic components. For example, the friable property of inorganic materials may be improved and various colors are available when an organic material is introduced into the matrix of an inorganic material. Alternatively, when an inorganic material is introduced into the matrix of an organic material, the mechanical strength and heat resistance can be increased and the hygroscopic property will be improved.

Generally, common organic-inorganic hybrid materials have to be heated to a relatively high temperature so as to remove the solvent in the system and to accomplish the required crosslinking reaction of the inorganic components with the removal of moisture. Polyimide has been widely used in semiconductor and printed circuit board industries due to its better mechanical property and heat resistance over conventional polymeric materials. Accordingly, polyimide/silica composite materials have drawn large attention, and extensive researches have been carrying out on such materials to obtain better properties and improve the shortcomings thereof.

At present, a polyimide/silica composite material is normally prepared by the following methods:

(1) A dianhydride and a diamine are added to a common solvent such as dimethylacetamide (DMAc) or N-methylpyrrolidine (NMP) to react with each other to produce poly (amic acid) (PAA). Water and a catalyst (either acidic or basic catalyst) are added to tetraethoxysilane (TEOS) or tetramethoxysilane (TMOS) in ethanol or tetrahydrofuran (THF), which is then hydrolyzed and polycondensed to produce oligomeric silica particles or micelles, and then the PAA solution is homogeneously stirred with the silica solution to obtain a precursor solution for polyimide/silica composite materials.

(2) A dianhydride and a diamine are added to a common solvent such as DMAc or NMP to react with each other to produce PAA, to which a monomer of TEOS or TMOS is directly added. The hydrolysis and polycondensation reaction of silica is directly carried out by utilizing the PAA as a catalyst to obtain a precursor solution for polyimide/silica composite material.

(3) A dianhydride is reacted with a diamine to produce PAA. An amino coupling agent such as 3-aminopropyltetraethoxysilane (APrTEOS) is added to the acid anhydride end of the PAA. Thereafter, TEOS or TMOS is added and the hydrolysis and polycondensation reaction occurs, such that a covalent bonding between the polyimide in the organic phase and the silica in the inorganic phase is created through the coupling agent, which enhances the compatibility between the organic phase and the inorganic phase so as to reduce the size of the silica particles and improve the distribution uniformity thereof to achieve better properties.

(4) A dianhydride is reacted with a diamine to produce PAA. Thereafter, TEOS or TMOS is directly added to the mixture. The hydrolysis and polycondensation reaction of silica is directly carried out by utilizing PAA as a catalyst. In addition, a coupling agent such as γ-glycidyloxypropyltrimethoxysilane (GTMOS) is added to enhance the compatibility between the organic phase and the inorganic phase through the intermolecular force such as hydrogen bonds to reduce the size of the silica particles and improve the distribution uniformity thereof to achieve better properties.

(5) A dianhydride is reacted with a diamine to produce PAA. An amino coupling agent such as 3-aminopropyltetraethoxysilane (APrTEOS) is added to the acid anhydride end of the PAA. Thereafter, TEOS or TMOS is added and the hydrolysis and polycondensation reaction occurs. In addition, a coupling agent such as γ-glycidyloxypropyltrimethoxysilane (GTMOS) is added to enhance the compatibility between the organic phase and the inorganic phase through intramolecular covalent bonds (provided by APrTEOS coupling agent) and the intermolecular force such as hydrogen bonds (provided by GTMOS coupling agent), so as to reduce the size of the silica particles and improve the distribution uniformity of the silica particles. High performance composite materials having better properties over the original polyimide may be manufactured through the above mentioned conventional methods for preparing polyimide/silica composite materials. However, when such a material is utilized to produce microstructures or specific, functional patterns on wafers or glass substrates, since the material is non-photosensitive, use must be made of a conventional lithography process to make the patterns after the film is cured, including the coating of a photoresist, exposing and developing of the photoresist, etching of the composite material film by means of reactive ion etching and the like, and stripping and cleaning of the residual photoresist with ozone and specific chemicals. The steps of the process are complicated and time-consuming. In addition, the parameter design during the etching of the polyimide/silica composite material is difficult due to its excellent resistance to etching. Moreover, the patterns after the etching process are susceptible to incomplete etching and high side wall roughness, and residual photoresist thereon.

SUMMARY OF THE INVENTION

The object of the present invention is to avoid the disadvantages of the common non-photosensitive polyimide/silica composite material film mentioned above. The invention provides a process for preparing a photosensitive polyimide/silica composite material film. The process of the invention is able to improve the precursor solutions for polyimide/silica composite materials prepared by the above-mentioned methods (1)~(5) to allow the precursor solutions can be used to produce a photosensitive polyimide/silica composite material film having a low volume shrinkage. Meanwhile, since the inventive photosensitive polyimide/silica composite material having a low volume shrinkage may be a photoresist per se, it may be directly subjected to the exposure and development step to give the desired patterns, thus reducing the process steps significantly while improving the throughput and the product yield.

DETAILED DESCRIPTION OF THE INVENTION

Figure 1:
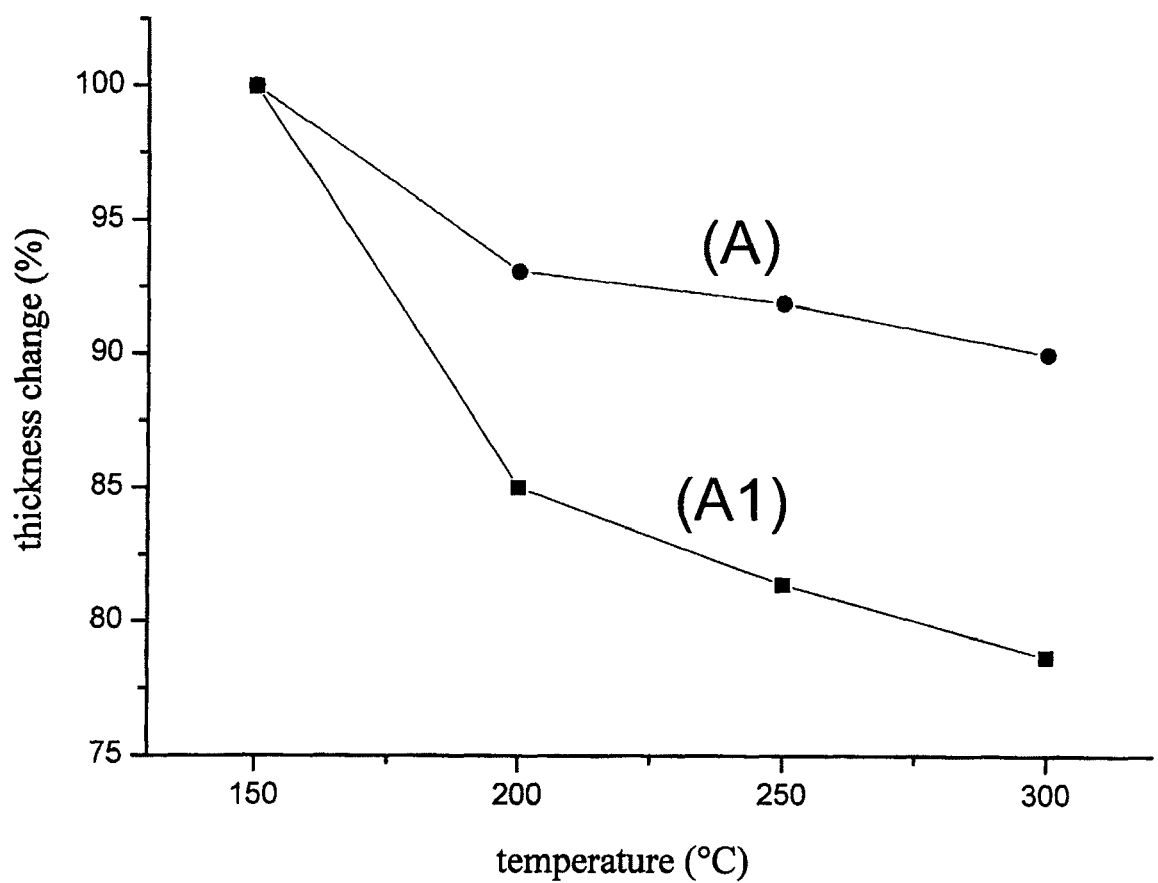
FIG. 1 is a plot that shows thickness versus baking stages at different temperatures of the films produced by spin coating, baking, and curing Solution (A) from Example 1 and Solution (A1) from Comparative Example 1 provided in the application.

The term "poly(amic acid)" used herein refers to the product containing —NH—CO— and a carboxylic acid functional group resulting from the reaction of a dianhydride and a diamine. The term "polyimide" refers to the product resulting from the cyclization of the —NH—CO— functional group and the carboxylic acid functional group during heating-up and curing of the poly(amic acid).

The term "halogen" used herein refers to fluorine, chlorine, bromine, or iodine.

The term "$C_{1-6}$-alkoxy" used herein refers to —O-alkyl, wherein the alkyl is a linear or branched alkyl having 1 to 6 carbon atoms and bonded through an oxygen atom. Examples of $C_{1-6}$-alkoxy groups include methoxy, ethoxy, n-propyoxy, isopropoxy, n-butoxy, sec-butoxy, tert-butoxy, n-pentoxy, neopentoxy and hexyloxy, etc.

The term "$C_{2-6}$-alkenoxy" used herein refers to —O-alkenyl, wherein the alkenyl is a linear or branched alkenyl having 2 to 6 carbon atoms and bonded through an oxygen atom. Examples of $C_{2-6}$-alkenoxy groups include ethenyloxy, propenyloxy, butenyloxy, pentenyloxy and hexenyloxy, etc.

The term "aryloxy" used herein refers to —O-aryl, wherein the aryl is, for example, phenyl or naphthyl.

The term "$C_{1-6}$-alkylene" used herein refers to the bivalent $C_{1-6}$-alkylene formed by removing 2 hydrogen atoms from an alkane having 1 to 6 carbon atoms. Examples of $C_{1-6}$-alkylene groups include methylene, ethylene, propylene, 1-methylpropylene, 2-methylpropylene, butylene, 1-methylbutylene, 2-methylbutylene, pentylene, and hexylene, etc.

The term "arylene" used herein refers to the bivalent aryl formed by removing 2 hydrogen atoms from a $C_{6-10}$-aromatic hydrocarbon. Examples of arylene groups include phenylene and naphthylene, etc.

The term "$C_{1-6}$-alkyl" used herein refers to the alkyl having 1 to 6 carbon atoms. Examples of $C_{1-6}$-alkyl groups include methyl, ethyl, n-propyl, isopropyl, 1-methylpropyl, 2-methylpropyl, n-butyl, isobutyl, neobutyl, 1-methylbutyl, 2-methylbutyl, amyl and hexyl, etc.

The term "epoxy ended group" refers to glycidyloxymethyl, glycidyloxyethyl or glycidyloxypropyl, etc.

The term "photo-polymerizable unsaturated group ended group" used herein refers to the group having an ethylenically unsaturated group at the end. Examples of such groups include vinyl, allyl, vinylphenyl, allylphenyl, propenyloxymethyl, propenyloxyethyl, propenyloxypropyl, propenyloxybutyl, propenyloxyamyl, propenyloxyhexyl, methylpropenyloxymethyl, methylpropenyloxyethyl, methylpropenyloxypropyl, methylpropenyloxybutyl, methylpropenyloxyamyl and methylpropenyloxyhexyl, etc.

The invention relates to a process for preparing a precursor solution for polyimide/silica composite material, comprising:
  (A) providing a poly(amic acid) solution;
  (B) adding an amino coupling agent of formula $H_2N—R^1—Si(R^2)_3$ (in which $R^1$ is a $C_{1-6}$-alkylene or an arylene, and $R^2$ may be the same or different, each representing a $C_{1-6}$-alkoxy) to the solution of step (A);
  (C) adding a monomer of a silane compound to the solution obtained from step (B) to allow the poly(amic acid) to carry a silica moiety;
  (D) adding a monomer of formula $(R^6)_xSi(R^7)_{(4-x)}$ (in which $R^6$ is a photo-polymerizable unsaturated group ended group, $R^7$ is halogen, $C_{1-6}$-alkoxy, $C_{2-6}$-alkenoxy or aryloxy, and x is an integer of 1 to 3) to the solution obtained from step (C) to allow the silica moiety to carry a photo-polymerizable unsaturated group; and
  (E) adding a monomer of formula $R^8N(R^9)_2$ (in which $R^8$ is a photo-polymerizable unsaturated group ended group and $R^9$ is a $C_{1-6}$-alkyl) to the solution obtained from step (D) to allow the poly(amic acid) to carry a photo-polymerizable unsaturated group and thus produce a precursor solution for a photo-polymerizable polyimide/silica composite material.

The above mentioned process for preparing the precursor solution may further comprise, before step (D), adding a coupling agent of formula $R^4Si(R^5)_3$ (in which $R^4$ is an epoxy ended group and $R^5$ is halogen, $C_{1-6}$-alkyl, $C_{2-6}$-alkenoxy, or aryloxy) to the solution obtained from step (C).

The invention further relates to another process for preparing a precursor solution for polyimide/silica composite material, comprising:

(A1) providing a poly(amic acid) solution;
(B1) forming a solution containing micelles or particles of a silica moiety from a monomer of a silane compound;
(C1) adding a monomer of formula $(R^6)_xSi(R^7)_{(4-x)}$ (in which $R^6$ is a photo-polymerizable unsaturated group ended group, $R^7$ is halogen, $C_{1-6}$-alkoxy, $C_{2-6}$-alkenoxy or aryloxy and x is an integer of 1 to 3) to the solution obtained from step (B1) to allow the silica moiety to carry a photo-polymerizable unsaturated group;
(D1) mixing the solutions from steps (A1) and (C1) to form a solution of polyimide/silica composite material, wherein the silica moiety carries a photo-polymerizable unsaturated group; and
(E1) adding a monomer of formula $R^8N(R^9)_2$ (in which $R^8$ is a photo-polymerizable unsaturated group ended group and $R^9$ is $C_{1-6}$-alkyl) to the solution obtained from step (D1) to allow the poly(amic acid) to carry a photo-polymerizable unsaturated group and thus form a precursor solution for a photo-polymerizable polyimide/silica composite material.

The above mentioned process for preparing the precursor solution may further comprise adding an amino coupling agent of formula $H_2N-R^1-Si(R^2)_3$ (in which $R^1$ is a $C_{1-6}$-alkylene or an arylene, and $R^2$ may be the same or different, each representing a $C_{1-6}$-alkoxy) to the solution obtained from step (A1) and then mixing it with the solution obtained from step (D1).

The invention also relates to a process for forming a polyimide/silica composite material film on a substrate, comprising coating the solution obtained from the above mentioned steps (E) and (E1) onto the substrate, exposing the coating to an energy ray after removal of the solvent by evaporation, and baking the coating to form a polyimide/silica composite material film.

The poly(amic acid) solution used in this invention may be prepared by the reaction of a dianhydride with a diamine. The dianhydride useful in this invention is an aromatic dianhydride which may be selected from those well known in the technical field to which the invention belongs, examples of which include, but are not limited to, pyromellitic dianhydride (PMDA), 4,4'-biphthalic anhydride (BPDA), 4,4'-hexafluoroisopropylidenediphthalic dianhydride (6FDA), 1-(trifluoromethyl)-2,3,5,6-benzenetetracarboxylic dianhydride (P3FDA), 1,4-bis(trifluoromethyl)-2,3,5,6-benzenetetracarboxylic dianhydride (P6FDA), 1-(3',4'-dicarboxyphenyl)-1,3,3-trimethylindan-5,6-dicarboxylic acid dianhydride, 1-(3',4'-dicarboxyphenyl-1,3,3-trimethylindan-6,7-dicarboxylic acid dianhydride, 1-(3',4'-dicarboxyphenyl)-3-methylindan-5,6-dicarboxylic acid dianhydride, 1-(3',4'-dicarboxyphenyl)-3-methylindan-6,7-dicarboxylic acid dianhydride, 2,3,9,10-perylenetetracarboxylic acid dianhydride, 1,4,5,8-naphthalenetetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-2,4,5,8-tetracarboxylic acid dianhydride, phenanthrene-1,8,9,10-tetracarboxylic acid dianhydride, 3,3'4,4'-benzophenonetetracarboxylic acid dianhydride, 2,2'3,3'-benzophenonetetracarboxylic acid dianhydride, 3,3'4,4'-biphenyltetracarboxylic acid dianhydride, 2,2'3,3'-biphenyltetracarboxylic acid dianhydride, 4,4'-isopropylidenediphthalic anhydride, 3,3'-isopropylidenediphthalic anhydride, 4,4'-oxydiphthalic anhydride, 4,4'-sulfonyldiphthalic anhydride, 3,3'-oxydiphthalic anhydride, 4,4'-methylenediphthalic anhydride, 4,4'-thiodiphthalic anhydride, 4,4'-ethylidenediphthalic anhydride, 2,3,6,7-naphthalenetetracarboxylic acid dianhydride, 1,2,4,5-naphthalenetetracarboxylic acid dianhydride, 1,2,5,6-naphthalenetetracarboxylic acid dianhydride, benzene-1,2,3,4-tetracarboxylic acid dianhydride, pyrazine-2,3,5,6-tetracarboxylic acid dianhydride and mixtures thereof. Pyromellitic dianhydride (PMDA), 4,4-biphthalic anhydride (BPDA), 4,4-hexafluoroisopropylidenediphthalic dianhydride (6FDA), 1-(trifluoromethyl)-2,3,5,6-benzenetetracarboxylic dianhydride (P3FDA), 1,4-bis(trifluoromethyl)-2,3,5,6-benzenetetracarboxylic dianhydride (P6FDA) and mixtures thereof are preferred.

The diamine used in this invention is an aromatic diamine which may be selected from those well known in the art. The examples include but are not limited to: 4,4'-octafluorobenzidine (OFB), tetrafluorophenylenediamine (TFPD), 2,2',5,5'-tetrachlorobenzidine (TCB), 3,3'-dichlorobenzidine (DCB), 3,3'-dimethyl-4,4'-diaminobiphenyl, 2,2'-dimethyl-4,4'-diaminobiphenyl, 2,2'-bis(trifluoromethyl)-4,4'-diaminobiphenyl (TFDB), 2,2'-bis(3-aminophenyl)hexafluoropropane, 2,2'-bis(4-aminophenyl)hexafluoropropane, 4,4'-oxobis(3-trifluoromethyl)aniline, 3,5-diaminobenzotrifluoride, tetrafluorophenylene diamine, tetrafluoro-m-phenylene diamine, 4,4'-oxydianiline (ODA), 1,4-bis(4-aminophenoxy-2-tertbutylbenzene (BATB), 2,2'-dimethyl-4,4'-bis(4-aminophenoxy)biphenyl (DBAPB), 2,2-bis[4-(4-aminophenoxy)phenyl]hexafluoropropane (BAPPH), 2,2'-bis(4-(4-aminophenoxy)phenyl)norborane (BAPN), 5-amino-1-(4'-aminophenyl)-1,3,3-trimethylindane, 6-amino-1-(4'-aminophenyl)-1,3,3-trimethylindane, 4,4'-methylenebis(o-chloroaniline), 3,3'-dichlorobenzidine, 3,3'-sulfonyldianiline, 4,4'-diaminobenzophenone, 1,5-diaminonaphthalene, bis(4-aminophenyl)diethyl silane, bis(4-aminophenyl)diphenyl silane, bis(4-aminophenyl)ethyl phosphine oxide, N-(bis(4-aminophenyl))-N-methyl amine, N-(bis(4-aminophenyl))-N-phenyl amine, 4,4'-methylenebis(2-methylaniline), 4,4'-methylenebis(2-methoxyaniline), 5,5'-methylenebis(2-aminophenol), 4,4'-methylenebis(2-methylaniline), 4,4'-oxybis(2-methoxyaniline), 4,4'-oxybis(2-chloroaniline), 2,2'-bis(4-aminophenol), 5,5'-oxybis(2-aminophenol), 4,4'-thiobis(2-methylaniline), 4,4'-thiobis(2-methoxyaniline), 4,4'-thiobis(2-chloroaniline), 4,4'-sulfonylbis(2-methylaniline), 4,4'-sulfonylbis(2-ethoxyaniline), 4,4'-sulfonylbis(2-chloroaniline), 5,5'-sulfonylbis(2-aminophenol), 3,3'-dimethyl-4,4'-diaminobenzophenone, 3,3'-dimethoxy-4,4'-diaminobenzophenone, 3,3'-dichloro-4,4'-diaminobenzophenone, 4,4'-diaminobiphenyl, m-phenylenediamine, p-phenylenediamine, 4,4'-methylenedianiline, 4,4'-thiodianiline, 4,4'-sulfonyldianiline, 4,4'-isopropylidenedianiline, 3,3'-dimethylbenzidine, 3,3'-dimethoxybenzidine, 3,3'-dicarboxybenzidine, 2,4-tolyldiamine, 2,5-tolyldiamine, 2,6-tolyldiamine, m-xylyldiamine, 2,4-diamino-5-choro-toluene, and 2,4-diamino-6-chloro-toluene, and mixtures thereof. 4,4'-Oxydianiline (ODA) and 4,4'-octafluorobenzidine (OFB) and mixture thereof are preferred.

According to the invention, the silane compound may be selected from those well-known in the art, usually having formula $Si(R^3)_4$, in which $R^3$ may be the same or different, each representing halogen, $C_{1-6}$-alkoxy, $C_{2-6}$-alkenoxy or aryloxy, provided that the four $R^3$ shall not be halogen simultaneously. Examples of the silane compounds include, but are not limited to, tetramethoxysilane, tetraethoxysilane, tetrapropoxysilane, tetrabutoxysilane and mixtures thereof. Tetramethoxysilane is preferred.

The amino coupling agent useful for the invention may be selected from those well known in the art, usually having formula $H_2N-R^1-Si(R^2)_3$, in which $R^1$ is a $C_{1-6}$-alkylene or an arylene, and $R^2$ may be the same or different, each representing a $C_{1-6}$-alkoxy. Examples of the amino coupling agent include, but are not limited to, 3-aminopropyltrimethoxysilane (APrTMOS), 3-aminopropyltriethoxysilane (APrTEOS), 3-aminophenyltrimethoxysilane (APTMOS), 3-aminophenyltriethoxysilane (APTEOS), and mixtures thereof 3-Aminopropyltriethoxysilane (APrTEOS) is preferred.

Examples of the coupling agent of formula $R^4Si(R^5)_3$ (in which $R^4$ is an epoxy ended group and each $R^5$ represents halogen, $C_{1-6}$-alkoxy, $C_{2-6}$-alkenoxy or aryloxy) used in the invention include, but are not limited to, γ-glycidyloxypropyltrimethoxysilane (GTMOS) and γ-glycidyloxypropyltriethoxysilane (GTEOS).

In the process according to this invention, the preparation of the precursor solution for a polyimide/silica composite material film is preferably conducted in a solvent. There is no special requirement for the solvent and any solvent that can dissolve the substances used in this invention can be used. Examples of the solvent include, but are not limited to, dimethyl sulfoxide (DMSO), N,N-dimethylacetamide (DMAc), 1-methylpyrrolidone (NMP), N,N-dimethylformamide (DMF), tetrahydrofuran (THF), Dioxane, methylethylketone (MEK), chloroform ($CHCl_3$), dichloromethane, γ-butyrolactone, butyl acetate, adipinketone, propylene glycol monomethylether acetate (PGMEA), tetrahydrofurfuryl alcohol (THFA), methylpentylketone (2-heptanone), diethylene glycol monohexyl ether (DGME), propylene glycol monomethyl ether (PGME), n-butyl acetate (nBA), propylene glycol monoethyl ether, propylene glycol mono-n-propyl ether, and diethylene glycol monobutyl ether acetate, and mixtures thereof. N,N-dimethylacetamide (DMAc) and 1-methylpyrrolidone (NMP) are preferred.

According to the process of this invention, the above mentioned components may be mixed at any ratio. Preferably, the components are mixed at the ratios at which no deposition or turbidness of the solution occurs after the reaction is stirred. Generally, the stirred reaction of each step is carried out at a temperature from 20° C. to 40° C., preferably at room temperature. Meanwhile, the reaction time in each step is at least 1 hour, usually 1 to 24 hours.

In this invention, a monomer of formula $(R^6)_xSi(R^7)_{(4-x)}$ is added to carry out the hydrolytic condensation reaction with the silica moiety in the solution so that the silica moiety carries a photo-polymerizable unsaturated side-chain group. Examples of the monomer include, but are not limited to, 3-methylpropenyloxypropyltrimethoxysilane, 3-methylpropenyloxypropyltriethoxysilane, 2-methylpropenyloxyethyltrimethoxysilane, 2-methylpropenyloxyethyltriethoxysilane, 3-methylpropenyloxybutyltrimethoxysilane, 3-methylpropenyloxybutyltriethoxysilane, 3-propenyloxypropyltrimethoxysilane, 3-propenyloxypropyltriethoxysilane, 2-propenyloxyethyltrimethoxysilane, 2-propenyloxyethyltriethoxysilane, 3-propenyloxybutyltrimethoxysilane, 3-propenyloxybutyltriethoxysilane, 3-methylmethylpropenyloxypropyltrimethoxysilane, 3-methylmethylpropenyloxypropyltriethoxysilane, 3-methylmethylpropenyloxyethyltrimethoxysilane, 3-methylmethylpropenyloxyethyltriethoxysilane, 3-methylmethylpropenyloxybutyltrimethoxysilane, 3-methylmethylpropenyloxybutyltriethoxysilane, 3-methylpropenyloxypropyltrimethoxysilane, 3-methylpropenyloxypropyltriethoxysilane, 3-methylpropenyloxyethyltrimethoxysilane, 3-methylpropenyloxyethyltriethoxysilane, 3-methylpropenyloxybutyltrimethoxysilane, 3-methylpropenyloxybutyltriethoxysilane, vinyltrimethoxysilane, vinyltriethoxysilane, 3-vinylphenyltrimethoxysilane, 3-vinylphenyltriethoxysilane, 4-vinylphenyltrimethoxysilane, 4-vinylphenyltriethoxysilane, allyltrimethoxysilane, allyltriethoxysilane, 4-allylphenyltrimethoxysilane, 4-allylphenyltriethoxysilane, bis(3-methylpropenyloxypropyl)dimethoxysilane, bis(3-methylpropenyloxypropyl)diethoxysilane, bis(2-methylpropenyloxyethyl)dimethoxysilane, bis(2-methylpropenyloxyethyl)diethoxysilane, bis(3-methylpropenyloxybutyl)dimethoxysilane, bis(3-methylpropenyloxybutyl)diethoxysilane, bis(3-propenyloxypropyl)dimethoxysilane, bis(3-propenyloxypropyl)diethoxysilane, bis(2-propenyloxyethyl)dimethoxysilane, bis(2-propenyloxyethyl)diethoxysilane, bis(3-propenyloxybutyl)dimethoxysilane, bis(3-propenyloxybutyl)diethoxysilane, divinyldimethoxysilane, divinyldiethoxysilane, diallyldimethoxysilane, diallyldiethoxysilane, tri(3-methylpropenyloxypropyl)methoxysilane, tri(3-methylpropenyloxypropyl)ethoxysilane, tri(2-methylpropenyloxyethyl)methoxysilane, tri(2-methylpropenyloxyethyl)ethoxysilane, tri(3-methylpropenyloxybutyl)methoxysilane, tri(3-methylpropenyloxybutyl)ethoxysilane, tri(3-propenyloxypropyl)methoxysilane, tri(3-propenyloxypropyl)ethoxysilane, tri(2-propenyloxyethyl)methoxysilane, tri(2-propenyloxyethyl)ethoxysilane, tri(3-propenyloxybutyl)methoxysilane, tri(3-propenyloxybutyl)ethoxysilane, trivinylmethoxysilane, trivinylethoxysilane, triallylmethoxysilane, and triallylethoxysilane and mixtures thereof. 3-methylpropenyloxypropyltrimethoxysilane, 3-methylpropenyloxypropyltriethoxysilane, 2-methylpropenyloxyethyltrimethoxysilane, and 2-methylpropenyloxyethyltriethoxysilane and mixtures thereof are preferred.

A monomer of formula $R^8N(R^9)_2$ is also introduced according to the invention to allow the poly(amic acid) to carry a photo-polymerizable unsaturated side-chain group. Examples of the monomer include, but are not limited to, 2-dimethylaminoethyl methacrylate, 2-diethylaminoethyl methacrylate, 2-dipropylaminoethyl methacrylate, 3-methylpropenyloxypropyldimethylamine, 3-methylpropenyloxypropyldiethylamine, 3-methylpropenyloxypropyldipropylamine, 3-propenyloxypropyldimethylamine, 3-propenyloxypropyldiethylamine, 3-propenyloxypropyldipropylamine,
3-methylmethylpropenyloxypropyldimethylamine,
3-methylmethylpropenyloxypropyldiethylamine,
3-methylmethylpropenyloxypropyldipropylamine,
4-(methylpropenyloxypropyl)phenyldimethylamine,
4-(methylpropenyloxypropyl)phenyldiethylamine,
4-(methylpropenyloxypropyl)phenyldipropylamine,
4-(methylpropenyloxyethyl)phenyldimethylamine,
4-(methylpropenyloxyethyl)phenyldiethylamine,
4-(methylpropenyloxyethyl)phenyldipropylamine,
4-(methylpropenyloxymethyl)phenyldimethylamine,
4-(methylpropenyloxymethyl)phenyldiethylamine,
4-(methylpropenyloxymethyl)phenyldipropylamine,
allyldimethylamine, allyldiethylamine, allyldipropylamine, 4-allyldimethylamine,
4-allyldiethylamine, 4-allyldipropylamine, 4-vinyldimethylamine, 4-vinyl diethylamine, and 4-vinyldipropylamine and mixtures thereof.
2-Dimethylaminoethyl methacrylate, 2-diethylaminoethyl methacrylate,
2-dipropylaminoethyl methacrylate, allyldimethylamine or mixtures thereof are preferred.

In the invention, the amounts of the monomer having formula $(R^6)_x Si(R^7)_{(4-x)}$ and the monomer having formula $R^8 N(R^9)_2$ used are normally 2 to 15 molar equivalents and 25 to 75 molar equivalents, respectively, and after being added to the reaction system, the monomers are stirred to react for at least 1 hour, usually 1 to 24 hours, at a temperature of 20° C. to 40° C., preferably at room temperature.

According to the process of this invention, step (E) may further comprise conducting the step in the presence of a photoinitiator. The photoinitiator in the invention is well known in the art, examples of which include, but are not limited to, 1,1-dimethyl-1-phenylbenzophenone (e.g. Irgacure-651 sold by CIBA Geigy Corp.), 1-hydroxy-cyclohexyl-phenylketone and bis(2,4,6-trimethylbenzoyl)phenylphosphine oxide (e.g. Irgacure-819 sold by CIBA Geigy Corp.).

The technology used in this invention for coating the precursor solution obtained from step (E) on a substrate for a photo-polymerizable polyimide/silica composite material may involve any coating method known in the art, such as rolling coating, flow coating, dip coating, spray coating, spin coating or curtain coating, among which spin coating is preferred in terms of the production of a uniform film.

Furthermore, according to the invention, a film-forming process after the coating of the resulting solution on the substrate may be carried out by a method well known in the art. For example, after the above coating step, the composite material is soft-baked on a hot plate or in a baking oven for about 1 to 60 minutes at a temperature ranging from about 40° C. to about 200° C., and the solvent is removed by evaporation. Thereafter, an exposure procedure is performed, that is, by using a mask having a pre-designed patterns above the soft-baked composite material film, the soft-baked composite material film is irradiated by a light source (e.g. a light source of ultraviolet rays or visible light having a wavelength of 100 to 500 nm, which may be a broadband mercury lamp with continuous wavelength or a light source with a single wavelength via a filter leaf) through the mask or the light source is projected through the mask onto the soft-baked composite material film, in a contacting or non-contacting manner; or the soft-baked composite material film is irradiated by a focus light source such as an electron beam or laser such that a photo-crosslinking polymerization reaction of the film occurs to produce a photosensitive composite material film. The exposure with ultraviolet rays is preferred. After that, the composite material is further processed on a hot plate or in a baking oven for post-exposure baking for about 1 to 120 minutes at a temperature of about 40° C. to about 200° C., and after removing the interferences in the vertical direction and most of the solvent in the film, the film after exposure is immersed into a developer which has a matrix of an organic solvent or the developer is sprayed properly onto the film to dissolve and remove the unexposed regions. Then, the film is rinsed with an organic solvent, which is then removed by nitrogen blowing or rapid spinning of the substrate, to obtain the desired patterns. Finally, the patterned film is subjected a cascade curing baking for about 30 to 200 minutes at a temperature ranging from about 120° C. to 300° C. to complete the ring closure of the poly(amic acid) to produce polyimide and the condensation of the silica, such that a specific pattern can be formed on the substrate from the photosensitive composite material film having a low volume shrinkage.

The developer and the organic solvent for rinsing used in the above film-forming process are obvious to those skilled in the art. Examples of the developer include, but are not limited to, a two-component, three-component, and four-component mixtures of dimethylsulphoxide (DMSO), N,N-dimethylacetamide (DMAc), 1-methylpyrrolidone (NMP), N,N-dimethylformamide (DMF), tetrahydrofuran (THF), dioxane, methylethylketone (MEK), chloroform ($CHCl_3$), dichloromethane, methanol, ethanol, isopropanol, n-butanol, polyethylene glycol diacrylate (PEGDA), γ-butyrolactone, butyl acetate, adipinketone, propylene glycol monomethylether acetate (PGMEA), tetrahydrofurfuryl alcohol (THFA), methylpentylketone (2-heptanone), diethylene glycol monohexyl ether (DGME), propylene glycol monomethyl ether (PGME), n-butyl acetate (nBA), propylene glycol monoethyl ether, propylene glycol mono-n-propyl ether, diethylene glycol monobutyl ether acetate and water, provided that one of the components is dimethyl sulphoxide (DMSO), N,N-dimethylacetamide (DMAc), 1-methylpyrrolidone (NMP) or N,N-dimethylformamide (DMF). The organic solvent used for rinsing, among others, includes, but is not limited to, tetrahydrofuran (THF), dioxane, methylethylketone (MEK), chloroform ($CHCl_3$), dichloromethane, methanol, ethanol, isopropanol, n-butanol, polyethylene glycol diacrylate (PEGDA), γ-butyrolactone, butyl acetate, adipinketone, propylene glycol monomethyl ether acetate (PGMEA), tetrahydrofurfuryl alcohol (THFA), methylpentylketone (2-heptanone), diethylene glycol monohexyl ether (DGME), propylene glycol monomethyl ether (PGME), n-butyl acetate (nBA), propylene glycol monoethyl ether, propylene glycol mono-n-propyl ether, or diethylene glycol monobutyl ether acetate or mixtures thereof.

The substrate used in the invention includes, but is not limited to, those without flexibility such as silicon wafer, germanium wafer, glass, and quartz, and those with flexibility such as polyethylene (PE), polyester (PET), and polyimide (PI).

The invention still relates to a precursor solution for polyimide/silica composite material, which is prepared by the process of this invention as mentioned above. The present precursor solution comprises poly(amic acid) having a silica moiety, wherein the silica moiety carries a photo-polymerizable unsaturated group or both the silica moiety and carboxylic group of the poly(amic acid) carry photo-polymerizable unsaturated groups. The photo-polymerizable unsaturated group is an ethylenically unsaturated group, which is selected from the group consisting of vinyl, allyl, vinylphenyl, allylphenyl, propenyloxymethyl, propenyloxyethyl, propenyloxypropyl, propenyloxybutyl, propenyloxyamyl, propenyloxyhexyl, methylpropenyloxymethyl, methylpropenyloxyethyl, methylpropenyloxypropyl, methylpropenyloxybutyl, methylpropenyloxyamyl and methylpropenyloxyhexyl.

The present precursor solution may be coated on the substrate for direct exposure and development and give a polyimide/silica composite material film after film formation.

Therefore, the invention also relates to a polyimide/silica hybrid material having a low volume shrinkage and exhibiting excellent heat resistance and optical properties, low coefficient of thermal expansion, low dielectric constant, and good micro-image resolution and dimensional stability. In particular, the thickness shrinkage ratio of the present composite material is less than 10% after being baked and cured (usually at a temperature of about 300° C.). These improvements will be further demonstrated by the following examples. With the above mentioned excellent properties, the present composite material is useful in many microelectronic elements and semiconductor elements, including printed circuit board, flexible circuit board or semiconductor dielectric layer material; and photoelectric elements, including liquid crystal screen spacers, optical waveguides or optical waveguide connectors.

The invention will be further illustrated by the following examples, which are intended to further describe the invention without limiting the scope thereof.

EXAMPLES

Example 1

8 mM 4,4'-oxydianiline (ODA) was dissolved in dimethylacetamide (DMAc) and 10 mM pyromellitic dianhydride (PMDA) was slowly added, and nitrogen was passed through with vigorous stirring. The reaction was conducted for 24 hours at room temperature to give a clear and viscous poly (amic acid) (PAA) solution. 4 mM 3-aminopropyltriethoxysilane (APrTEOS) was added. The reaction was stirred for 4 hours at room temperature, followed by the addition of 8.21 mM tetramethoxysilane (TMOS) and after stirring it for 30 minutes, 1.67 mM de-ionized water was added. The reaction was conducted for 24 hours at room temperature. Thereafter, 5.61 mM 2-methylpropenyloxyethyltriethoxysilane (MPTES) was added and stirred to react for 4 hours at room temperature. 20 mM dimethylallylamine (DMAA) was then added and stirred to react for 4 hours at room temperature. Lastly, 0.24 mM bis(2,4,6-trimethylbenzoyl)phenylphosphine oxide was added as a photoinitiator and stirred for 30 minutes for dissolution and uniform dispersion to produce a precursor solution for photosensitive polyimide/silica composite material, called "Solution (A)."

Comparative Example 1

8 mM 4,4'-oxydianiline (ODA) was dissolved in dimethylacetamide (DMAc) and 10 mM pyromellitic dianhydride (PMDA) was slowly added and nitrogen was passed through with vigorous stirring. The reaction was conducted for 24 hours at room temperature to give a clear and viscous poly (amic acid) (PAA) solution. 4 mM 3-aminopropyltriethoxysilane (APrTEOS) was added and stirred to react for 4 hours at room temperature. 20 mM dimethylallylamine (DMAA) was then added and stirred to react for 4 hours at room temperature. Lastly, 0.24 mM bis(2,4,6-trimethylbenzoyl)phenylphosphine oxide was added as a photoinitiator and stirred for 30 minutes for dissolution and uniform dispersion to produce a precursor solution for photosensitive polyimide/silica composite material, called "Solution (A1)."

Test 1

Solution (A) was coated by spin coating on a 4-inch silicon wafer for 30 seconds at a speed of 1500 rpm and then was soft-baked on a hot plate for 4 minutes at a temperature of 120° C., followed by exposure using a blank mask and an ultraviolet light source of 365 nm wavelength with an exposure energy of 1800 mJ/cm$^2$. After the exposure, it was baked on a hot plate for 10 minutes at a temperature of 120° C. Then, cascade hard-baking for curing was performed on a hot plate. The respective curing temperatures and times were: 150° C. for 30 minutes; 200° C. for 30 minutes; 250° C. for 30 minutes; and 300° C. for 30 minutes. A polyimide/silica composite material film is thus obtained.

Solution (A1) was coated by spin coating on a 4-inch silicon wafer for 30 seconds at a speed of 1500 rpm and then soft-baked on a hot plate for 4 minutes at a temperature of 120° C., followed by exposure using a blank mask and an ultraviolet light source of 365 nm wavelength with an exposure energy of 1800 mJ/cm$^2$. After the exposure, it was baked on a hot plate for 10 minutes at a temperature of 120° C. Then, cascade hard-baking for curing was performed on a hot plate. The respective curing temperatures and times are: 150° C. for 30 minutes; 200° C. for 30 minutes; 250° C. for 30 minutes; and 300° C. for 30 minutes. A polyimide film is thus obtained.

FIG. 1 is a plot that shows thickness versus baking stages at different temperatures of the films produced by spin coating, baking, and curing Solution (A) from Example 1 and Solution (A1) from Comparative Example 1. As shown in FIG. 1, the films shrank by 9.1% (A) and 21.3% (A1), respectively, after being baked and cured at a temperature of 300° C., which demonstrates that the polyimide/silica composite material film of the present invention has a lower volume shrinkage than a common polyimide film. This is because after curing of a common polyimide film, the ring closure of an amic acid group results in forming an imido group such that the tertiary amine on the DMAA is unable to remain in the film in the form of an acid-base ionic salt with the amic acid group, thereby resulting in significant volume shrinkage. As for the polyimide/silica composite material film prepared by the present invention, the crosslinking polymerization between DMAA and MPTES of the silica moiety occurs after exposure, therefore, although after curing, an imido group is formed due to the ring closure of an amic acid group and the tertiary amine on DMAA is unable to exist in the form of an acid-base ionic salt with an amido group, it still remains in the film via a covalent bond with MPTES, thus reducing the volume shrinkage caused by the loss of DMAA.

Test 2

Figure 2:
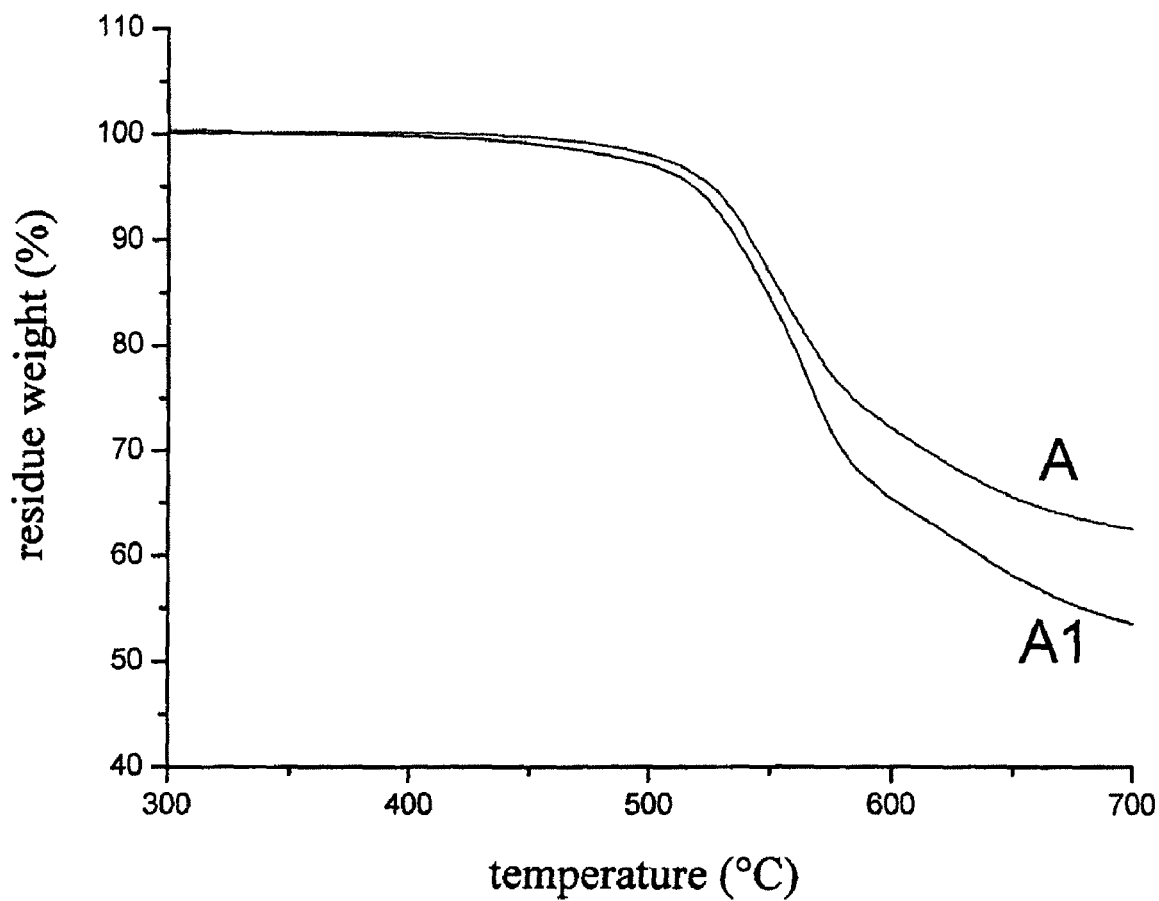
FIG. 2 shows a TGA picture of the films formed by coating, soft-baking, exposing, and curing Solution (A) and Solution (A1) in Test 2 provided in the application.
Figure 3:
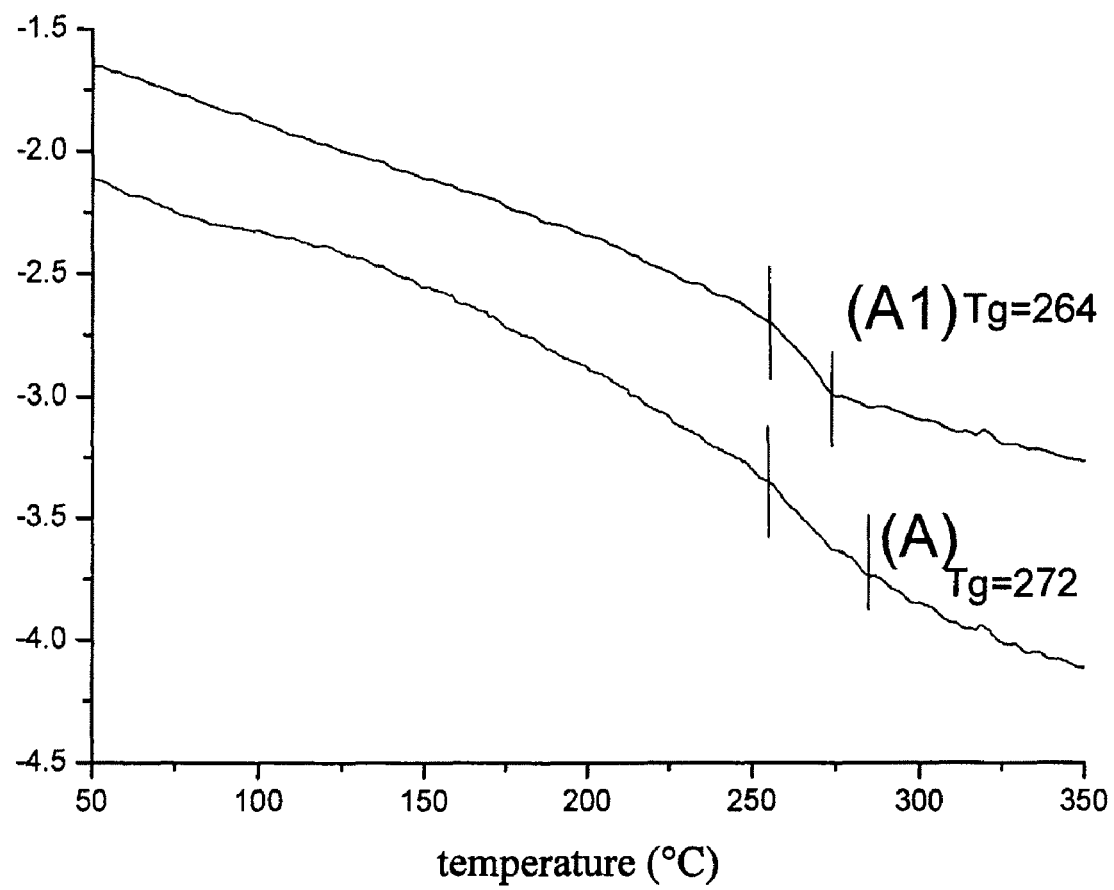
FIG. 3 is a DSC picture of the films formed by coating, soft-baking, exposing, and curing Solution (A) and Solution (A1) in Test 2 provided in the application.
Figure 4:
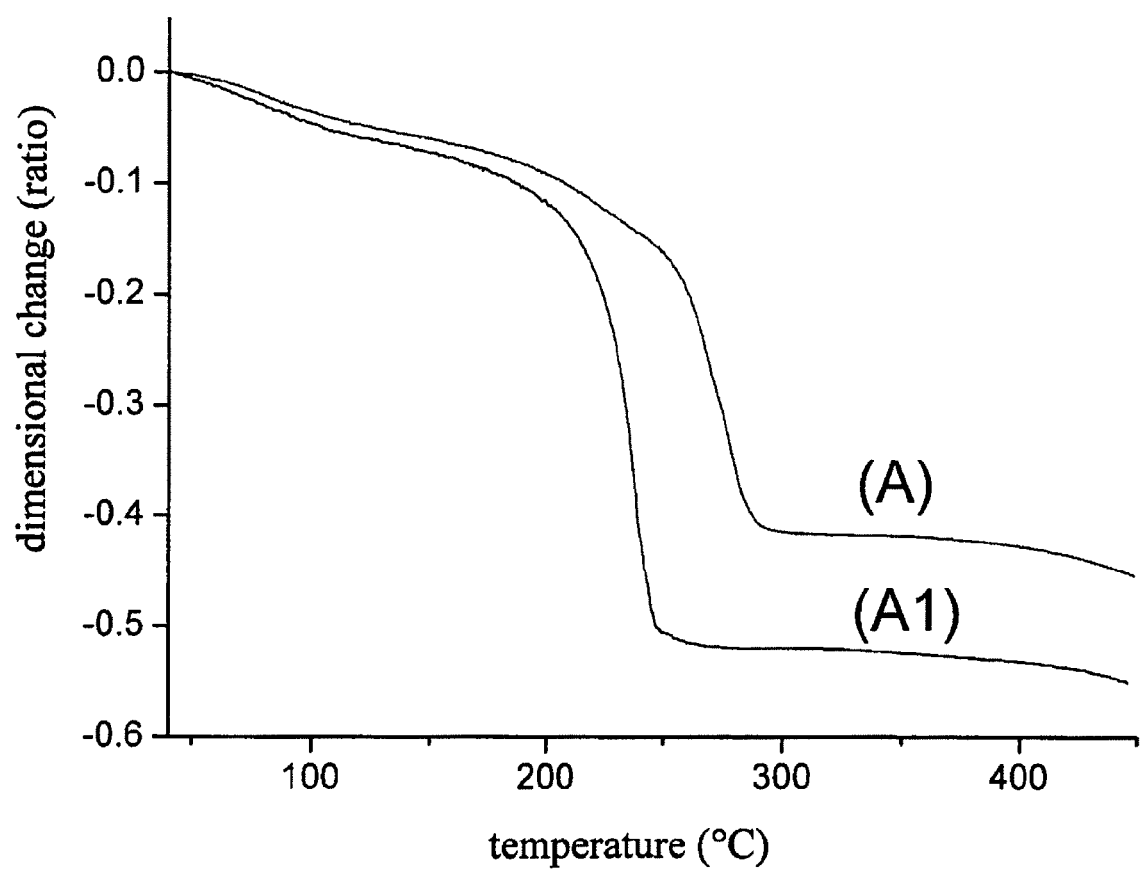
FIG. 4 is a TMA picture of the films formed by coating, soft-baking, exposing, and curing Solution (A) and Solution (A1) in Test 2 provided in the application.

Thermal property tests of TGA, DSC and TMA were performed on a 200 μm thick film prepared by soft-baking, exposing, and curing Solution (A) from Example 1 and Solution (A1) from Comparative Example 1 on a Teflon plate. The results are shown in FIGS. 2 to 4. Temperatures of degradation (Td) obtained from TGA are 525° C. (A) and 517° C. (A1), respectively; temperatures of glass transition (Tg) are 272° C. (A) and 264° C. (A1), respectively; and coefficients of thermal expansion are 576 ppm/° C. (A) and 737 ppm/° C. (B), respectively. The above results show that the polyimide/silica composite material film having a low volume shrinkage prepared by the present invention exhibits a better thermal stability and lower coefficient of thermal expansion as compared with the polyimide material per se.

Test 3

Figure 5:
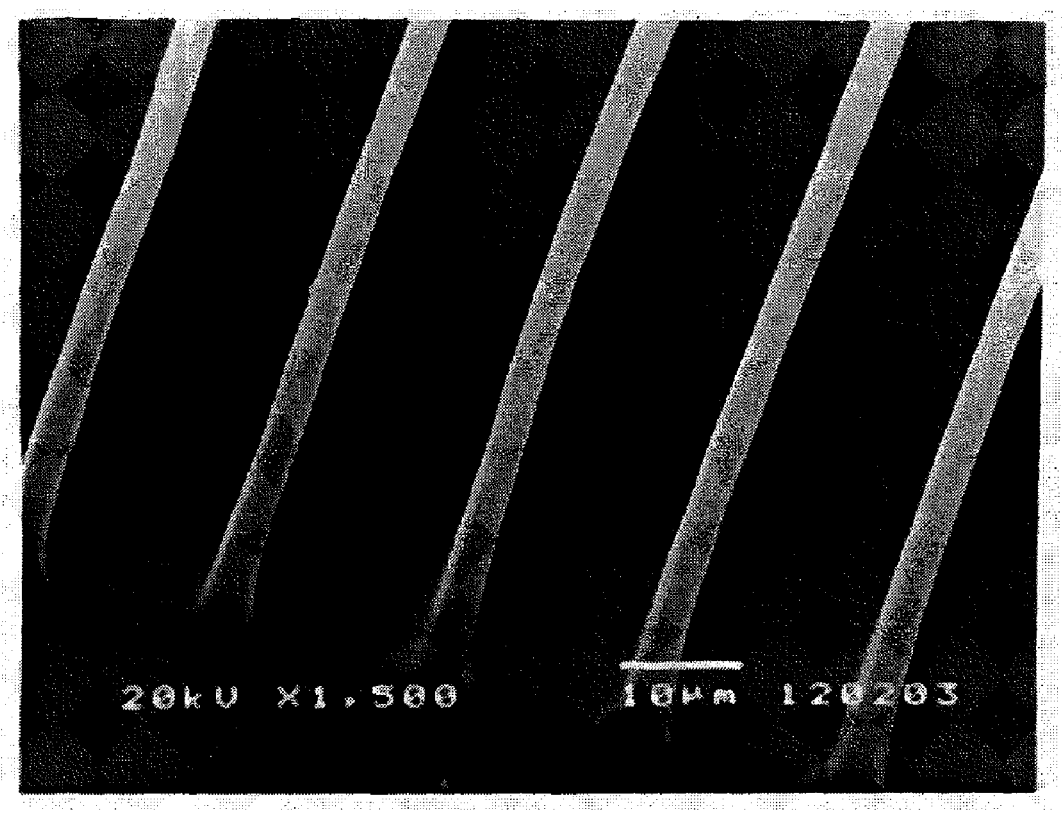
FIG. 5 is a SEM picture of the patterns formed by coating, soft-baking, exposing, developing, and curing Solution (A) in Test 3 provided in the application.

Solution (A) obtained from Example 1 was coated by spin coating on a 4-inch silicon wafer for 30 seconds at a speed of 1500 rpm, and then soft-baked on a hot plate for 4 minutes at a temperature of 120° C. After that, it was exposed using a patterned mask and an ultraviolet light source of 365 nm wavelength, with an exposure energy of 1800 mJ/cm², followed by post-exposure baking on a hot plate for 10 minutes at a temperature of 120° C. A mixture solution of DMSO/γ-butyrolactone/H₂O at a weight ratio of 70/20/10 was used as a developer. The wafer was immersed into the developer for 3 minutes, and the developer is removed by rinsing with methanol. After blowing off methanol with nitrogen, the cascade hard-baking and curing were performed on a hot plate. The respective curing temperatures and times were: 150° C. for 30 minutes; 200° C. for 30 minutes; 250° C. for 30 minutes; and 300° C. for 30 minutes. The patterns formed by the photosensitive polyimide/silica composite material film having a low volume shrinkage were obtained. A SEM picture of the micro-image patterns obtained is shown in FIG. 5 with a line width of 3 μm, demonstrating the good micro-image pattern resolution of the material.

Test 4

Figure 6:
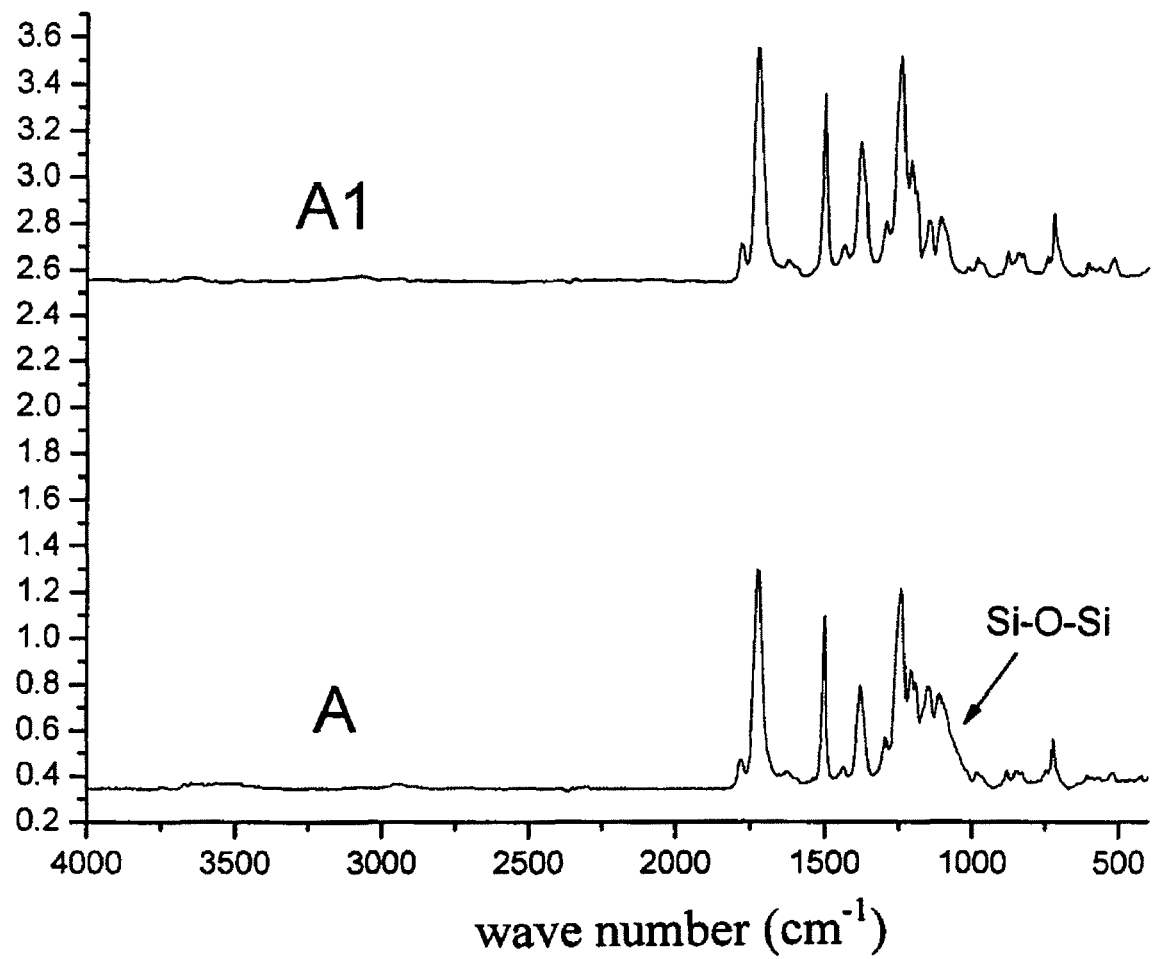
FIG. 6 shows the infrared spectra of the films after coating, soft-baking, exposing, and curing Solution (A) from Example 1 and Solution (A1) from Comparative Example 1 provided in the application.
Figure 7:
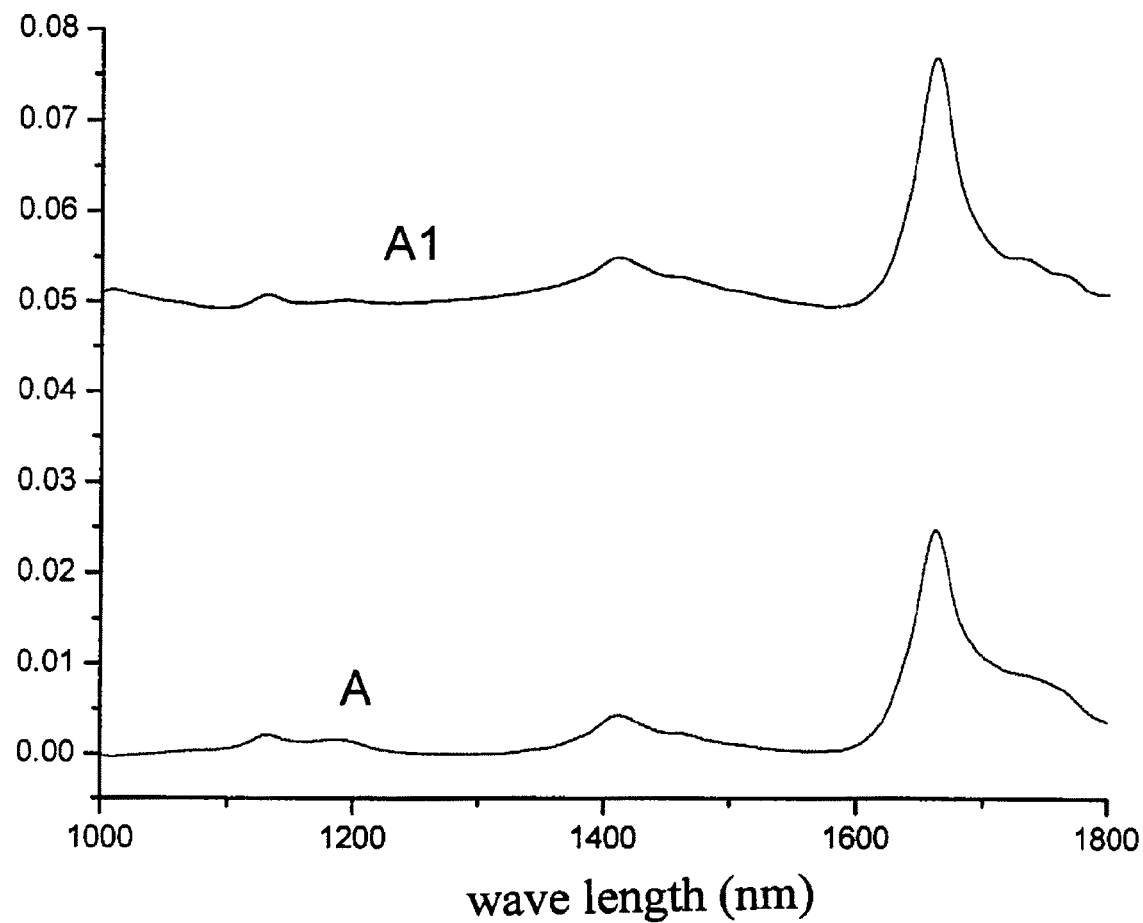
FIG. 7 shows the near infrared spectra of the films formed by coating, soft-baking, exposing, and curing Solution (A) from Example 1 and Solution (A1) from Comparative Example 1 provided in the application.
Figure 8:
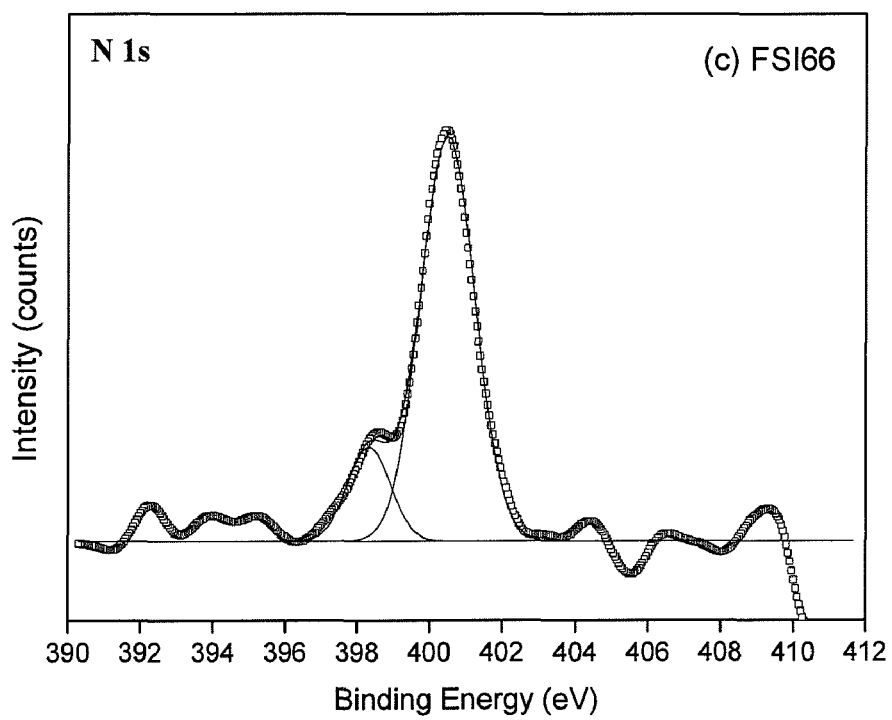
FIG. 8 is the XPS spectra of the films formed by coating, soft-baking, exposing, and curing Solution (A) from Example 1 and Solution (A1) from Comparative Example 1 provided in the application.
Figure 8:
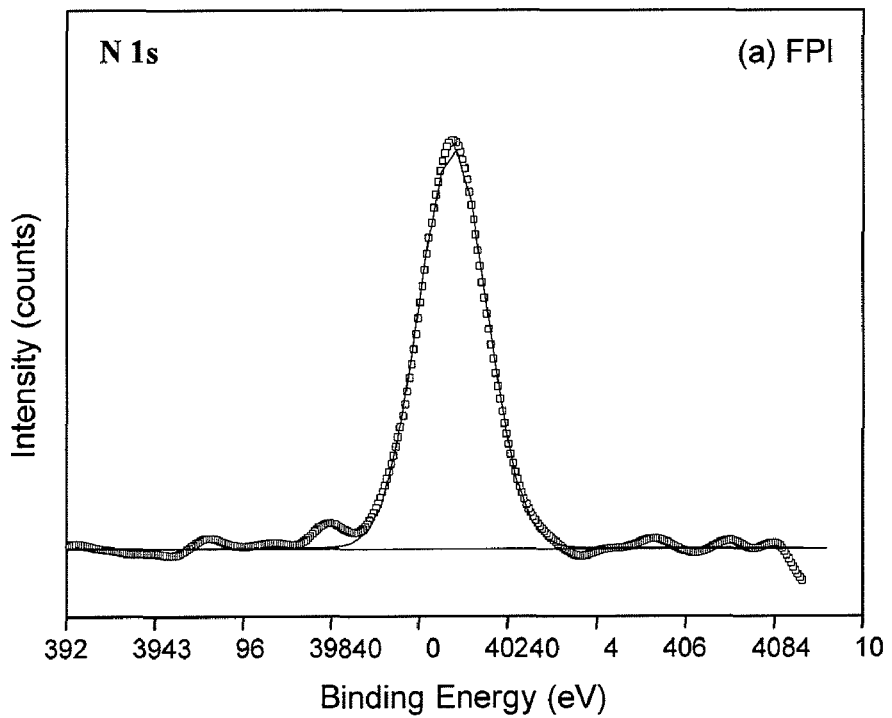

Property analyses for the films obtained from Example 1 and Comparative Example 1 were carried out, including infrared spectrum, near infrared spectrum, and XPS, the results of which are shown in FIG. 6 to FIG. 8.

As shown in the infrared spectrum of FIG. 6, the reaction of the polyimide/silica (A) is completed and no obvious vibration absorption of Si—O—Si at 1000-1200 cm⁻¹ is observed.

As shown in the near infrared spectra of FIG. 7, absorption loss at 1310 nm is mainly resulted from the secondary frequency multiplication absorption of the C—H bond nearby and the combined absorption of vibration and rotation. Therefore, the optical transmission loss of the composite material may be reduced by the lower density of the C—H bond.

The photoelectron (XPS) N1s spectra of the films prepared from Solution (A) and Solution (A1) are respectively shown in FIG. 8. The spectrum of (A) has an additional characteristic peak with a binding energy of 398.3 eV, which is caused by the nitrogen of the DMAA, as compared with the spectrum of (A1), and the common 400.6 characteristic peak of the two spectra is caused by the nitrogen of the polyimide. As demonstrated by the XPS spectra, the DMAA is retained in the film, thus reducing volume shrinkage of the composite material film prepared from solution (A).

In general, the polyimide/silica composite material film having a low volume shrinkage prepared by the process of this invention has a lower volume shrinkage than that prepared from a traditional polyimide material, and has excellent micro-image resolution and dimensional stability. In particular, after curing, the composite material prepared according to this invention exhibits good heat resistance, optical property, low coefficient of thermal expansion, and low optical transmission loss, etc., which may be useful in heat-resistant, high performance optical waveguides, or microelectronics and semiconductor manufacturing as a dielectric layer material. At the same time, the material per se may be used as a photoresist component for direct exposure and development to produce the desired patterns, thus significantly reducing process steps by eliminating the conventional, complicated etching process and improving the throughput and the product yield.

The invention claimed is:

1. A process for preparing a precursor solution for polyimide/silica composite material, comprising:
   (A1) providing a poly(amic acid) solution;
   (B1) forming a solution containing micelles or particles of a silica moiety from a monomer of a silane compound;
   (C1) adding a monomer of formula $(R^6)_x Si(R^7)_{(4-x)}$ (in which $R^6$ is a photo-polymerizable unsaturated group ended group, $R^7$ is halogen, $C_{1-6}$-alkoxy, $C_{2-6}$-alkenoxy or aryloxy and x is an integer of 1 to 3) to the solution obtained from step (B1) to allow the silica moiety to carry a photo-polymerizable unsaturated group;
   (D1) mixing the solutions from steps (A1) and (C1) to form a solution of polyimide/silica composite material, wherein the silica moiety carries a photo-polymerizable unsaturated group; and
   (E1) adding a monomer of formula $R^8 N(R^9)_2$ (in which $R^8$ is a photo-polymerizable unsaturated group ended group and $R^9$ is $C_{1-6}$-alkyl) to the solution obtained from step (D1) to allow the poly(amic acid) to carry a photo-polymerizable unsaturated group and thus form a precursor solution for a photo-polymerizable polyimide/silica composite material.

2. The process of claim 1, wherein step (E1) is conducted in the presence of a photoinitiator.

3. The process of claim 1, further comprising adding an amino coupling agent of formula $H_2N—R^1—Si(R^2)_3$ (in which $R^1$ is a $C_{1-6}$-alkylene or an arylene, and $R^2$ may be the same or different, each represents $C_{1-6}$-alkoxy) to the solution obtained from step (A1) and then mixing it with the solution obtained from step (D1).

4. The process of claim 1, wherein said monomer of the silane compound has formula $Si(R^3)_4$, in which $R^3$ may be the same or different, each represents halogen, $C_{1-6}$-alkoxy, $C_{2-6}$-alkenoxy, or aryloxy, provided that not all the four $R^3$ are halogen at the same time.

5. The process of claim 4, wherein said monomer of the silane compound includes TMOS, TEOS, tetrapropoxysilane, or tetrabutyloxysilane or mixtures thereof.

6. The process of claim 1, wherein the photo-polymerizable unsaturated group is an ethylenically unsaturated group, which is selected from the group consisting of vinyl, allyl, vinylphenyl, allylphenyl, propenyloxymethyl, propenyloxyethyl, propenyloxypropyl, propenyloxybutyl, propenyloxyamyl, propenyloxyhexyl, methylpropenyloxymethyl, methylpropenyloxyethyl, methylpropenyloxypropyl, methylpropenyloxybutyl, methylpropenyloxyamyl and methylpropenyloxyhexyl.

7. The process of claim 1, wherein the monomer of formula $(R^6)_x Si(R^7)_{(4-x)}$ is selected from the group consisting of
   3-methylpropenyloxypropyltrimethoxysilane,
   3-methylpropenyloxypropyltriethoxysilane,
   2-methylpropenyloxyethyltrimethoxysilane,
   2-methylpropenyloxyethyltriethoxysilane,
   3-methylpropenyloxybutyltrimethoxysilane,
   3-methylpropenyloxybutyltriethoxysilane,
   3-propenyloxypropyltrimethoxysilane,
   3-propenyloxypropyltriethoxysilane, 2-propenyloxyethyltrimethoxysilane,
   2-propenyloxyethyltriethoxysilane, 3-propenyloxybutyltrimethoxysilane,
   3-propenyloxybutyltriethoxysilane,
   3-methylmethylpropenyloxypropyltrimethoxysilane,
   3-methylmethylpropenyloxypropyltriethoxysilane,
   3-methylmethylpropenyloxyethyltrimethoxysilane,
   3-methylmethylpropenyloxyethyltriethoxysilane,
   3-methylmethylpropenyloxybutyltrimethoxysilane,
   3-methylmethylpropenyloxybutyltriethoxysilane,
   3-methylpropenyloxypropyltrimethoxysilane,
   3-methylpropenyloxypropyltriethoxysilane,
   3-methylpropenyloxyethyltrimethoxysilane,
   3-methylpropenyloxyethyltriethoxysilane,
   3-methylpropenyloxybutyltrimethoxysilane,
   3-methylpropenyloxybutyltriethoxysilane, vinyltrimethoxysilane, vinyltriethoxysilane, 3-vinylphenyltrimethoxysilane, 3-vinylphenyltriethoxysilane, 4-vinylphenyltrimethoxysilane,
4-vinylphenyltriethoxysilane, allyltrimethoxysilane, allyltriethoxysilane,
4-allylphenyltrimethoxysilane, 4-allylphenyltriethoxysilane,
bis(3-methylpropenyloxypropyl)dimethoxysilane,
bis(3-methylpropenyloxypropyl)diethoxysilane,
bis(2-methylpropenyloxyethyl)dimethoxysilane,
bis(2-methylpropenyloxyethyl)diethoxysilane,
bis(3-methylpropenyloxybutyl)dimethoxysilane,
bis(3-methylpropenyloxybutyl)diethoxysilane,
bis(3-propenyloxypropyl)dimethoxysilane,
bis(3-propenyloxypropyl)diethoxysilane,
bis(2-propenyloxyethyl)dimethoxysilane,
bis(2-propenyloxyethyl)diethoxysilane,
bis(3-propenyloxybutyl)dimethoxysilane,
bis(3-propenyloxybutyl)diethoxysilane, divinyldimethoxysilane, divinyldiethoxysilane, diallyldimethoxysilane, diallyldiethoxysilane,
tri(3-methylpropenyloxypropyl)methoxysilane,
tri(3-methylpropenyloxypropyl)ethoxysilane,
tri(2-methylpropenyloxyethyl)methoxysilane,
tri(2-methylpropenyloxyethyl)ethoxysilane,
tri(3-methylpropenyloxybutyl)methoxysilane,
tri(3-methylpropenyloxybutyl)ethoxysilane,
tri(3-propenyloxypropyl)methoxysilane,
tri(3-propenyloxypropyl)ethoxysilane,
tri(2-propenyloxyethyl)methoxysilane,
tri(2-propenyloxyethyl)ethoxysilane,
tri(3-propenyloxybutyl)methoxysilane,
tri(3-propenyloxybutyl)ethoxysilane, trivinylmethoxysilane, trivinylethoxysilane, triallylmethoxysilane, and triallylethoxysilane and mixtures thereof.

8. The process of claim 7, wherein the monomer of formula $(R^6)_xSi(R^7)_{(4-x)}$ is selected from the group consisting of
3-methylpropenyloxypropyltrimethoxysilane,
3-methylpropenyloxypropyltriethoxysilane,
2-methylpropenyloxyethyltrimethoxysilane, and
2-methylpropenyloxyethyltriethoxysilane and mixtures thereof.

9. The process of claim 1, wherein the monomer of formula $R^8N(R^9)_2$ is selected from the group consisting of 2-dimethylaminoethyl methacrylate,
2-diethylaminoethyl methacrylate, 2-dipropylaminoethyl methacrylate,
3-methylpropenyloxypropyldimethylamine,
3-methylpropenyloxypropyldiethylamine,
3-methylpropenyloxypropyldipropylamine,
3-propenyloxypropyldimethylamine, 3-propenyloxypropyldiethylamine,
3-propenyloxypropyldipropylamine,
3-methylmethylpropenyloxypropyldimethylamine,
3-methylmethylpropenyloxypropyldiethylamine,
3-methylmethylpropenyloxypropyldipropylamine,
4-(methylpropenyloxypropyl)phenyldimethylamine,
4-(methylpropenyloxypropyl)phenyldiethylamine,
4-(methylpropenyloxypropyl)phenyldipropylamine,
4-(methylpropenyloxyethyl)phenyldimethylamine,
4-(methylpropenyloxyethyl)phenyldiethylamine,
4-(methylpropenyloxyethyl)phenyldipropylamine,
4-(methylpropenyloxymethyl)phenyldimethylamine,
4-(methylpropenyloxymethyl)phenyldiethylamine,
4-(methylpropenyloxymethyl)phenyldipropylamine,
allyldimethylamine, allyldiethylamine, allyldipropylamine, allyldimethylamine, allyldiethylamine, allyldipropylamine, vinyldimethylamine, vinyldiethylamine and vinyldipropylamine and mixtures thereof.

10. The process of claim 9, wherein the monomer of formula $R^8N(R^9)_2$ is selected from the group consisting of 2-dimethylaminoethyl methacrylate, 2-diethylaminoethyl methacrylate, 2-dipropylaminoethyl methacrylate, and allyldimethylamine and mixtures thereof.

11. The process of claim 1, wherein said monomer of the silane compound has formula $Si(R^3)_4$, in which $R^3$ may be the same or different, each represents halogen or $C_{1-6}$-alkoxy, provided that not all the four $R^3$ are halogen at the same time;
wherein the monomer of formula $(R^6)_xSi(R^7)_{(4-x)}$ is selected from the group consisting of: 3-methylpropenyloxypropyltrimethoxysilane,
3-methylpropenyloxypropyltriethoxysilane,
2-methylpropenyloxyethyltrimethoxysilane,
2-methylpropenyloxyethyltriethoxysilane,
3-methylpropenyloxybutyltrimethoxysilane,
3-methylpropenyloxybutyltriethoxysilane,
3-propenyloxypropyltrimethoxysilane,
3-propenyloxypropyltriethoxysilane, 2-propenyloxyethyltrimethoxysilane,
2-propenyloxyethyltriethoxysilane, 3-propenyloxybutyltrimethoxysilane,
3-propenyloxybutyltriethoxysilane,
3-methylmethylpropenyloxypropyltrimethoxysilane,
3-methylmethylpropenyloxypropyltriethoxysilane, 3-methylmethylpropenyloxy-ethyltrimethoxysilane,
3-methylmethylpropenyloxyethyltriethoxysilane,
3-methylmethylpropenyloxybutyltrimethoxysilane,
3-methylmethylpropenyloxy-butyltriethoxysilane,
3-methylpropenyloxypropyltrimethoxysilane,
3-methylpropenyloxypropyltriethoxysilane,
3-methylpropenyloxyethyltrimethoxysilane,
3-methylpropenyloxyethyltriethoxysilane,
3-methylpropenyloxybutyltrimethoxysilane,
3-methylpropenyloxybutyltriethoxysilane, and mixtures thereof; and
wherein the monomer of formula $R^8N(R^9)_2$ is selected from the group consisting of 2-dimethylaminoethyl methacrylate, 2-diethylaminoethyl methacrylate, and 2-dipropylaminoethyl methacrylate, and mixtures thereof, and
wherein said photo-polymerizable unsaturated group is an ethylenically unsaturated group, which is selected from the group consisting of propenyloxymethyl, propenyloxyethyl, propenyloxypropyl, propenyloxybutyl, propenyloxyamyl, propenyloxyhexyl, methylpropenyloxymethyl, methylpropenyloxyethyl, methylpropenyloxypropyl, methylpropenyloxybutyl, methylpropenyloxyamyl and methylpropenyloxyhexyl, and mixtures thereof.

* * * * *